United States Patent
Oh et al.

(10) Patent No.: US 7,036,377 B2
(45) Date of Patent: May 2, 2006

(54) APPARATUS AND METHOD FOR CALCULATING VIBRATION DISPLACEMENT OF VIBRATOR

(75) Inventors: Hyun Ho Oh, Gyeonggi-Do (KR); Seong A Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/895,284

(22) Filed: Jul. 21, 2004

(65) Prior Publication Data
US 2006/0016264 A1   Jan. 26, 2006

(51) Int. Cl.
*G01H 11/00* (2006.01)
(52) U.S. Cl. .................... 73/649; 73/655; 356/357
(58) Field of Classification Search .............. 73/649, 73/653, 654, 655; 356/357, 351, 360, 361, 356/345, 349
See application file for complete search history.

(56) References Cited

U.S. PATENT DOCUMENTS 6,172,752 B1 * 1/2001 Haruna et al. .............. 356/503
6,381,015 B1 * 4/2002 Sonehara et al. ........... 356/497

FOREIGN PATENT DOCUMENTS

JP        11351958    * 12/1999
SU         1384922    * 10/1987

* cited by examiner

*Primary Examiner*—Hezron Williams
*Assistant Examiner*—Jacques M Saint-Surin
(74) *Attorney, Agent, or Firm*—Birch, Stewart, Kolasch & Birch, LLP

(57) ABSTRACT

An apparatus for calculating vibration displacement of a vibrator according to one aspect of the present invention includes a mirror attached to a predetermined portion of a vibrator; a light emitting unit installed at a predetermined position spaced apart from the mirror and irradiating light on the mirror; a light receiving unit installed side by side with the light emitting unit, receiving light reflected by the mirror and generating an output voltage corresponding to the amount of the receiving light; and a vibration displacement calculating unit for calculating vibration displacement of the vibrator based on the generated output voltage.

18 Claims, 4 Drawing Sheets

APPARATUS AND METHOD FOR CALCULATING VIBRATION DISPLACEMENT OF VIBRATOR

BACKGROUND OF THE INVENTION

1. Field of the Invention

The present invention relates to an apparatus and method for calculating vibration displacement of vibrator, and more particularly, to an apparatus and method for calculating vibration displacement of a vibrator capable of accurately measuring vibration displacement of a vibrator.

2. Description of the Background Art

In general, a vibration displacement sensor for sensing displacement of a vibrator by using an optical device is commonly used for washing machines. The washing machines are mechanical devices for washing the laundry by performing washing, rinsing and dehydrating strokes. Recently, convenience in usage of a washing machine, as well as a cleaning function, is a critical factor for consumers to determine purchase of a product.

In order to increase convenience of usage, developments of products have been accelerated, and especially, a drum-type washing machine for washing the laundry without damage receives much attention in the market.

FIG. 1 is a sectional view showing the structure of a general drum-type washing machine.

As shown in FIG. 1, the general drum-type washing machine includes: a tub 14 installed inside a main body 11 and fixed by springs 12 and dampers 13; a drum 15 installed at the inner side of the tub 14; and a driving motor 16 for rotating the drum 15.

In the general drum-type washing machine, the drum 15 is rotated by more than 1000 times per minute, whereby a dehydration stroke is performed by using a centrifugal force. At this time, however, the laundry in the drum 15 may be inclined to one side, so severe oscillation can be transferred to the tub 14 and the main body 11 and big noise can be generated.

Such vibration of the drum-type washing machine much degrades efficiency of the dehydration stroke, so a method for accurately sensing the amount of generated vibration to solve the inclination phenomenon of the laundry according to the amount of vibration is required.

Currently, in order to sense the generated vibration, a safety switch or a Colpitts resonance circuit is commonly used, which will now be described with reference to FIGS. 2 and 3.

FIG. 2 shows a principle for sensing vibration by using the safety switch in accordance with a conventional art.

As shown in FIG. 2, in the conventional method using the safety switch, as vibration of the tub is increased, one side of the safety switch 21 is hit. Thus, the other side of the safety switch 21 connected to the spring is turned counter-clockwise in order to make the two contacts 23 and 24 short, or turned clockwise in order to make two contacts open, whereby abnormal vibration of the tub 14 is sensed.

However, the conventional method using the safety switch is advantageously simple in its structure, but disadvantageous in that the amount of vibration cannot be accurately sensed and a trouble occurs due to mechanical weakness, difficulty in installation, defective contacts or degradation of a restoring force of the spring.

FIG. 3 shows a principle for sensing vibration by using the Colpitts resonance circuit in accordance with the conventional art.

As shown in FIG. 3, the conventional system using the Colpitts resonance circuit includes: a bobbin 31 having a movement path with a certain length; a magnetic core 32 moving inside the bobbin according to vibration applied from outside; and a coil 33 wound outside the bobbin so change inductance according to the magnetic core 32.

In the conventional method using the Colpitts resonance circuit, when inductance of the coil 33 is changed according to positions of the magnetic core 32, frequency of the Colpitts resonance circuit is changed. Thus, by detecting the amount of the changed inductance, an amount of vibration corresponding to the detected amount of inductance is measured.

However, the conventional method using the Colpitts resonance circuit is advantageous in that its structure is simple but because the amount of change in the inductance is so small that a circuit is required to amplify the changed amount of inductance and detect a resonance frequency in order to accurately measure the amount of vibration. This results in a high cost and the washing machine needs to be accurately leveled in order to perform an optimum function of the Colpitts resonance circuit.

As mentioned above, the conventional vibration displacement calculating method, which uses the safety switch or the Colpitts resonance circuit to measure the amount of vibration, fails to accurately sense the amount of vibration.

SUMMARY OF THE INVENTION

Therefore, one object of the present invention is to provide an apparatus and method for calculating vibration displacement of a vibrator capable of accurately measuring vibration displacement of a vibrator by irradiating light to a vibrator, receiving light reflected from the vibrator and measuring an output voltage corresponding to the amount of the received light.

To achieve these and other advantages and in accordance with the purpose of the present invention, as embodied and broadly described herein, there is provided an apparatus for calculating vibration displacement of a vibrator including: a mirror attached to a predetermined portion of a vibrator; a light emitting unit installed at a predetermined position spaced apart from the mirror and irradiating light on the mirror; a light receiving unit installed side by side with the light emitting unit, receiving light reflected by the mirror and generating an output voltage corresponding to the amount of the receiving light; and a vibration displacement calculating unit for calculating vibration displacement of the vibrator based on the generated output voltage.

To achieve the above object, there is also provided a method for calculating vibration displacement of a vibrator including: measuring the shortest distance between a mirror attached to a vibrator and a light emitting unit; irradiating light to the mirror and receiving light reflected from the mirror; measuring an output voltage value according to the amount of received light; detecting a maximum peak voltage value and a minimum peak voltage value among the measured output voltage values; and calculating vibration displacement of the vibrator based on the detected maximum peak voltage value, the minimum peak voltage value and the measured shortest distance.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

An apparatus and method for calculating vibration displacement of a vibrator capable of accurately measuring vibration displacement of a vibrator by irradiating light to a vibrator, receiving light reflected from the vibrator and measuring an output voltage corresponding to the amount of the received light in accordance with preferred embodiments of the present invention will now be described with reference to the accompanying drawings.

Figure 1:
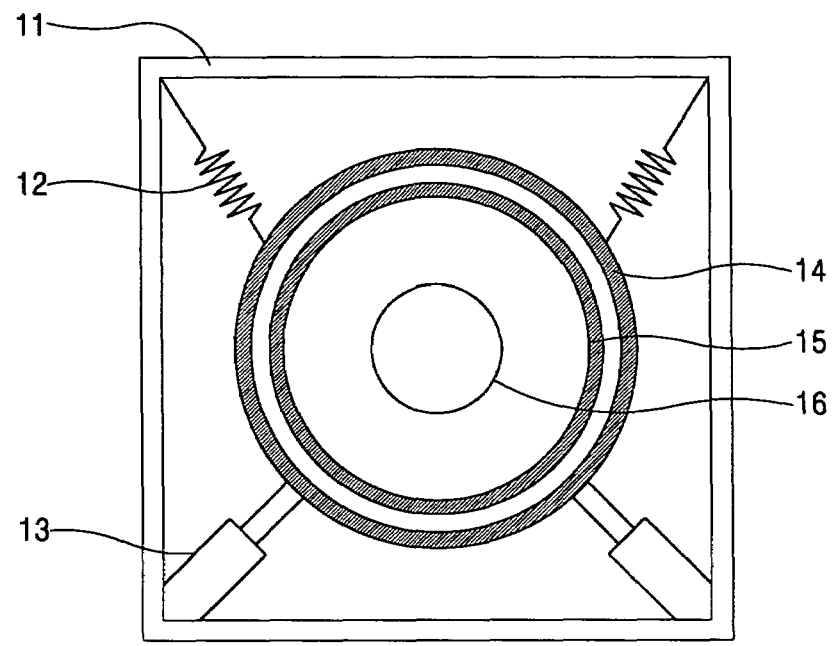
FIG. 1 shows the structure of a general drum-type washing machine.
Figure 2:
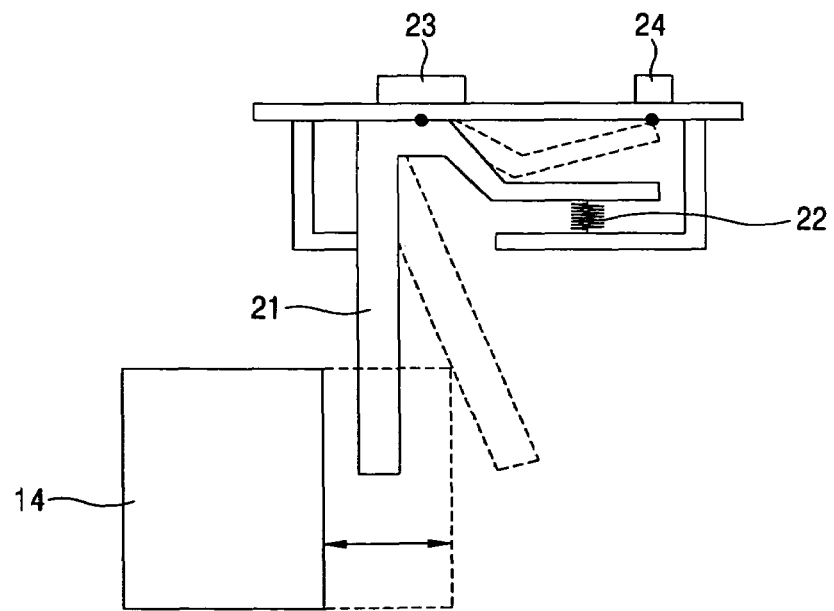
FIG. 2 is a view for explaining a principle for sensing vibration by using a safety switch in accordance with a conventional art.
Figure 3:
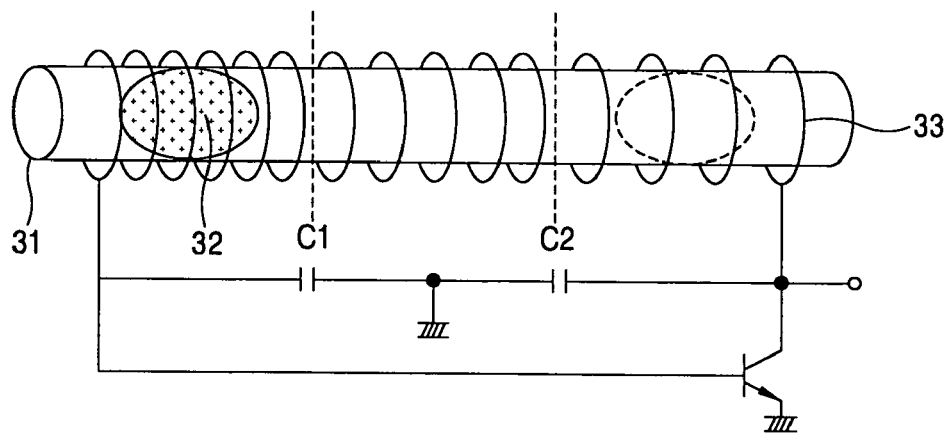
FIG. 3 is a view for explaining a principle for sensing vibration by using a Colpitts resonance circuit in accordance with the conventional art.
Figure 4:
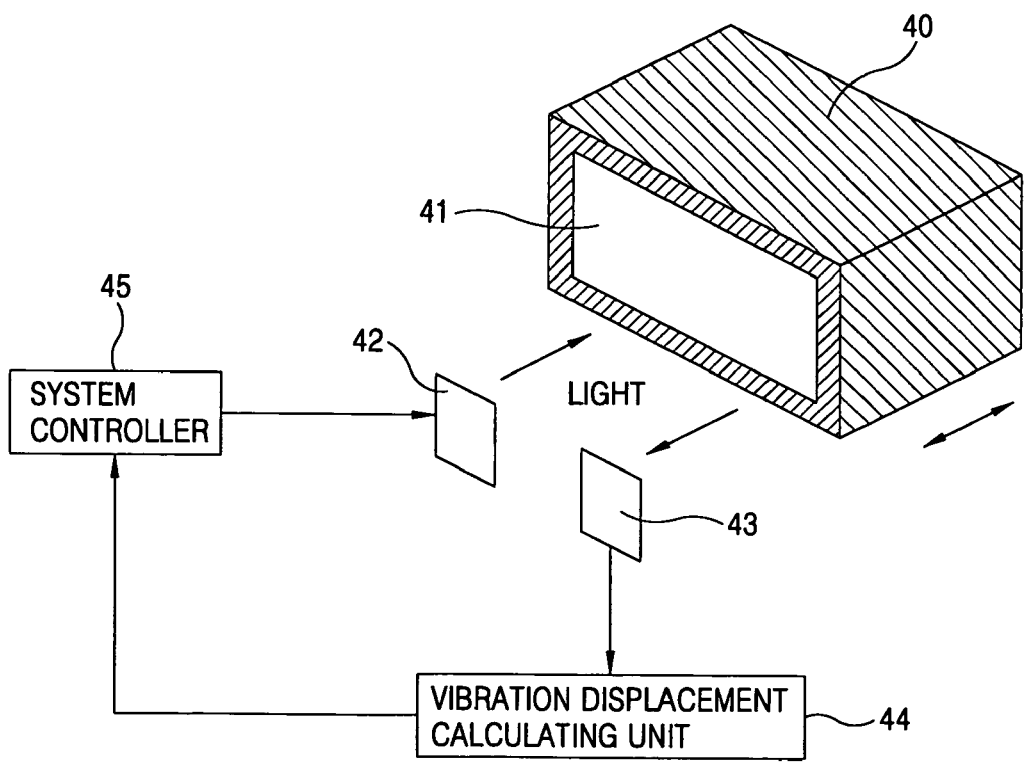
FIG. 4 shows the construction of an apparatus for calculating vibration displacement of a vibrator in accordance with the present invention.

FIG. 4 shows the construction of an apparatus for calculating vibration displacement of a vibrator in accordance with the present invention.

As shown in FIG. 4, an apparatus for calculating vibration displacement of a vibrator includes: a mirror 41 attached to a predetermined portion of a vibrator 40; a light emitting unit 42 installed at a predetermined position spaced apart from the mirror 41 and irradiating light on the mirror 41; a light receiving unit 43 installed side by side with the light emitting unit 42, receiving light reflected by the mirror 41 and generating an output voltage corresponding to the amount of the receiving light; a vibration displacement calculating unit 44 for calculating vibration displacement of the vibrator 40 based on the generated output voltage; and a system controller 45 for determining whether vibration has been generated from the vibrator based on the calculated vibration displacement.

A method for calculating vibration displacement of a vibrator in accordance with the present invention will now be described with reference to FIG. 5.

Figure 5:
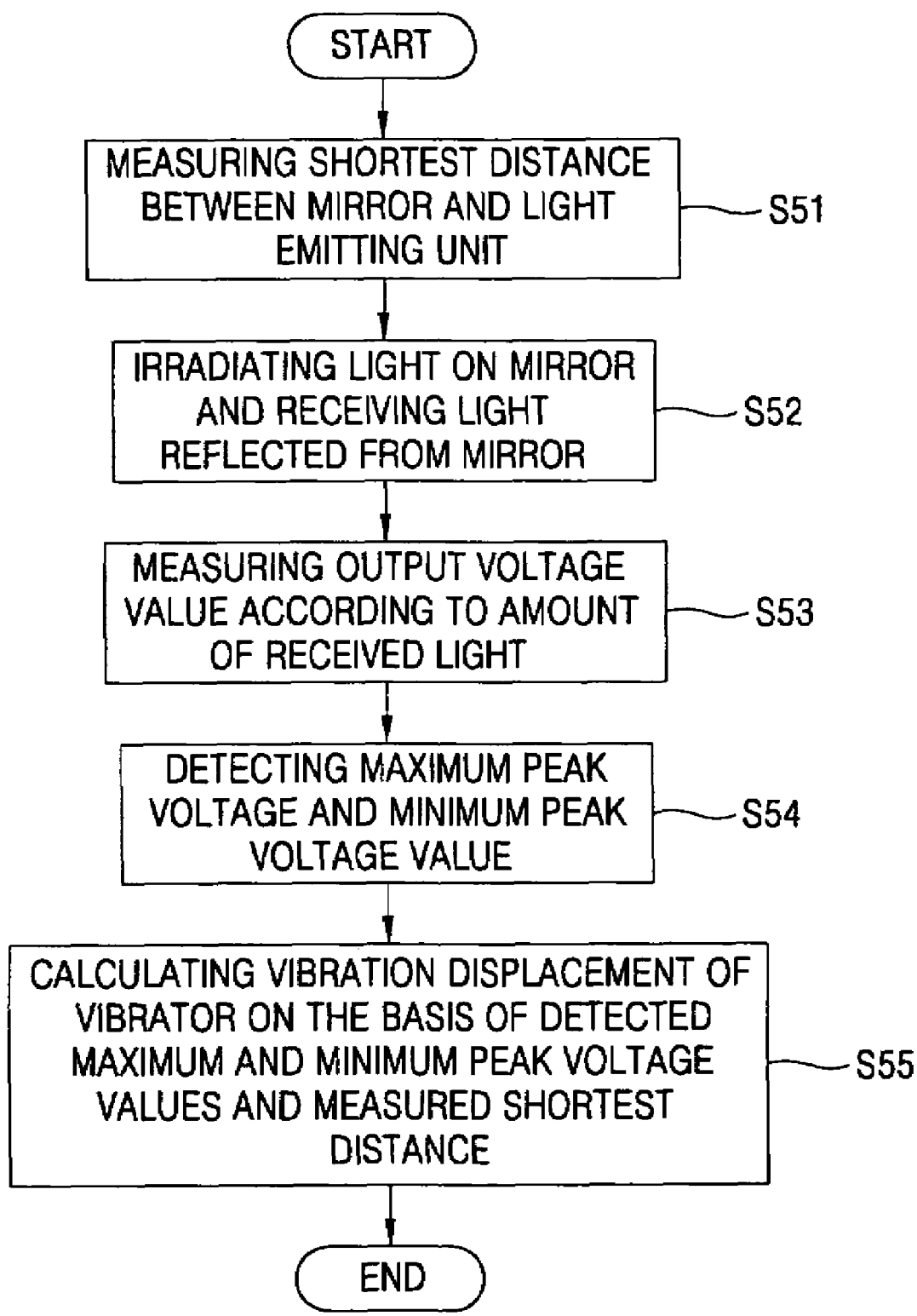
FIG. 5 is a flow chart of a method for calculating vibration displacement of a vibrator in accordance with the present invention.

FIG. 5 is a flow chart of a method for calculating vibration displacement of a vibrator in accordance with the present invention.

As shown in FIG. 5, the method for calculating vibration displacement of a vibrator includes: measuring the shortest distance between a mirror attached to a vibrator and a light emitting unit (step S51); irradiating light to the mirror and receiving light reflected from the mirror (step S52); measuring an output voltage value according to the amount of received light (step S53); detecting a maximum peak voltage value and a minimum peak voltage value among the measured output voltage values (step S54); and calculating vibration displacement of the vibrator based on the detected maximum peak voltage value, the minimum peak voltage value and the measured shortest distance (step S55).

The method for calculating vibration displacement of a vibrator will now be described in detail.

First, the vibration displacement calculating unit 44 measures the shortest distance between the mirror 41 attached at the vibrator 40 and the light emitting unit 42 (step S51).

The light emitting unit 42 emits light toward the mirror 41 vibrating up and down, left and right and forward and backward according to vibration of the vibrator 40.

The light emitting unit 42 is positioned such that light can be irradiated at the central portion of the mirror 41. As the light emitting unit 42, a device having a large divergence angle, and especially, a light emitting diode is preferably used.

The light emitting unit 42 can be controlled to periodically irradiate light simultaneously when the vibrator 40 is driven, but if light is irradiated continuously, much current flows at the light emitting unit 42 to shorten its life span, so the light emitting unit 42 is preferably controlled to irradiate light during only a predetermined time period. Namely, when vibration of the vibrator 40 is sensed, a low level signal is applied to turn on the light emitting unit 42 to irradiate light. And if no vibration of the vibrator 40 is sensed, a high level signal is applied to turn off the light emitting unit 42, so light is not irradiated.

The mirror 41 installed at a predetermined position of the vibrator 40 reflects light irradiated from the light emitting unit 42, so the light receiving unit 43 receives light reflected by the mirror 41 or generates an output voltage corresponding to the received light (step S52). Herein, the light receiving unit 43 is positioned to receive light reflected form the central portion of the mirror 41, and employs one of a photo diode and a photo transistor as a photoelectric transducer.

Though the apparatus for detecting vibration displacement of a vibrator of the present invention includes the mirror 41 attached at the vibrator 40 and the light emitting unit 42 and the light receiving unit 43 which are installed side by side at positions spaced apart as long as a predetermined distance from the mirror 41, the apparatus also can be constructed such that the light emitting unit 42 and the light receiving unit 43 are attached side by side at the vibrator 40 and a mirror 41 is installed at a position spaced apart as long as a predetermined from the light emitting unit 42 and the light receiving unit 43.

In addition, in the apparatus for detecting vibration displacement of a vibrator in accordance with the present invention, the light emitting unit 42 and the light receiving unit 43 are installed side by side horizontally but they can be also installed side by side vertically.

When the vibrator 40 is vibrated left and right or up and down, a length of a path of light until it is received by the light receiving unit 43 after being irradiated from the light emitting unit 42 and reflected on the mirror 41 does not change, so there is no change in the amount of light.

Accordingly, the apparatus for calculating vibration displacement of a vibrator in accordance with the present invention can measure only vibration displacement when the vibrator 40 is vibrated in the forward/backward direction.

The principle for generating an output voltage by the light receiving unit 43 will now be described with reference to FIG. 6.

Figure 6:
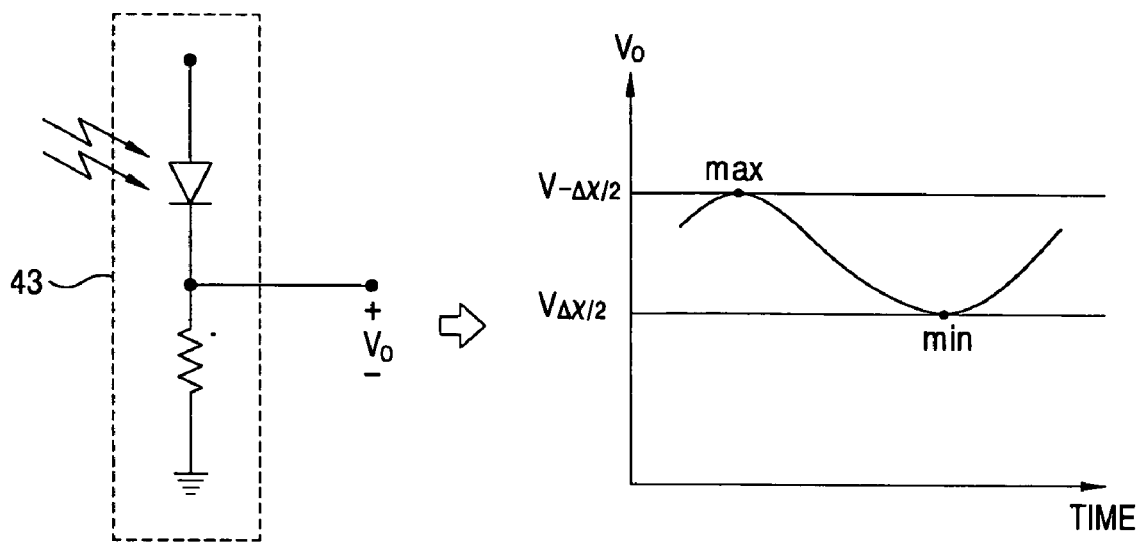
FIG. 6 is a view for explaining a principle for generating an output voltage by a light receiving unit of FIG. 4.

FIG. 6 is a view for explaining a principle for generating an output voltage by a light receiving unit of FIG. 4.

As shown in FIG. 6, as the light receiving unit 43 receives light reflected from the mirror 41, an output voltage ($V_0$) according to the amount of received light is generated (step S53). Accordingly, the generated output voltage ($V_0$) is generated between a maximum peak voltage ($V_{-\Delta x/2}$) and a minimum peak voltage ($V_{\Delta x/2}$) so as to be changed according to vibration of the vibrator 40 in the forward/backward direction. Herein, the maximum peak voltage ($V_{-\Delta x/2}$) means an output voltage measured when the distance between the light receiving unit 43 and the mirror 41 nears as much as $-\Delta x/2$ according to vibration of the vibrator in the forward direction of the light receiving unit 43, and the minimum peak voltage ($V_{\Delta x/2}$) means an output voltage measured when the distance between the light receiving unit 43 and the mirror 41 is distanced as much as $\Delta x/2$ according to vibration of the vibrator 40 in the backward direction of the light receiving unit 43.

Thereafter, the vibration displacement calculating unit 44 detects the maximum peak voltage value ($V_{-\Delta x/2}$) and the minimum peak voltage value ($V_{\Delta x/2}$) among output voltages generated from the light receiving unit 43 (step S54) and calculates vibration displacement generated according to vibration of the vibrator 40 in the forward/backward direction on the basis of the detected maximum peak voltage value ($V_{-\Delta x/2}$) and the minimum peak voltage value ($V_{\Delta x/2}$) (step S55).

The detailed construction of the vibration displacement calculating unit 44 for calculating vibration displacement of the vibrator 40 will now be described with reference to FIG. 7.

Figure 7:
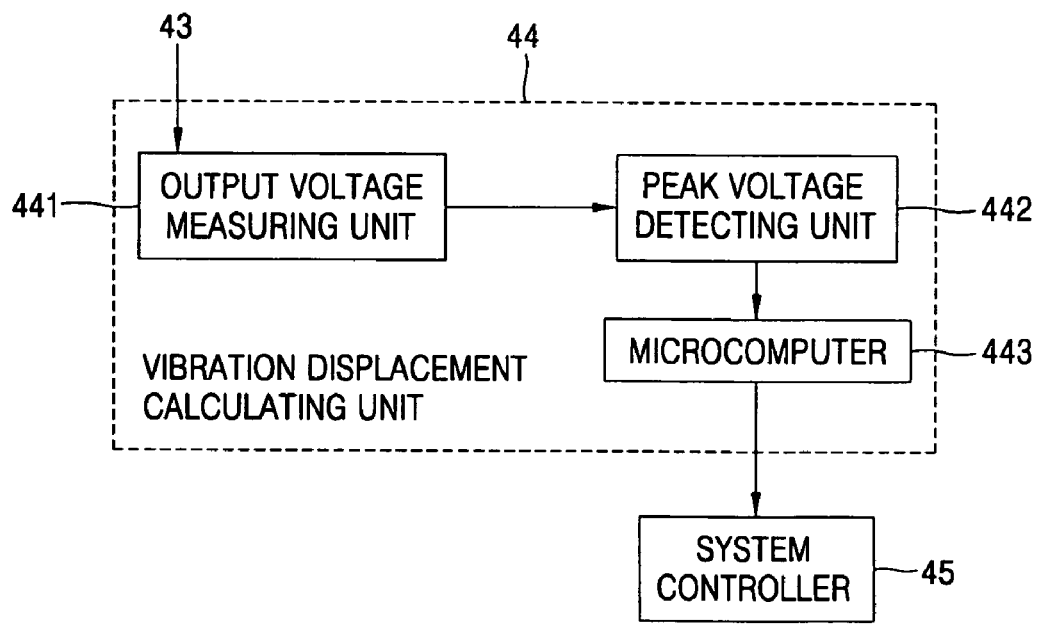
FIG. 7 shows the detailed construction of a vibration displacement calculating unit of FIG. 4.

FIG. 7 shows the detailed construction of a vibration displacement calculating unit of FIG. 4.

As shown in FIG. 7, the vibration displacement calculating unit includes: an output voltage measuring unit 441 for measuring a value of an output voltage generated from the light receiving unit 43; a peak voltage detecting unit 442 for detecting the maximum peak voltage value ($V_{-\Delta x/2}$) and the minimum peak voltage value ($V_{\Delta x/2}$) among measured output voltage values; and a microcomputer 443 for calculating vibration displacement generated according to vibration of the vibrator in the forward/backward direction on the basis of the detected maximum and minimum peak voltage values ($V_{-\Delta x/2}$ and $V_{\Delta x/2}$) and the previously measured shortest distance value.

The previously measured shortest distance value means a value obtained by measuring the distance between the light emitting unit 42 and the mirror 41 when there is no vibration at the vibrator 40.

The operational principle of the vibration displacement calculating unit is as follows.

First, the output voltage measuring unit 441 measures a value of an output voltage generated from the light receiving unit 43 and outputs measured voltage values to the peak voltage detector 442.

The peak voltage detector 442 detects the maximum peak value ($V_{-\Delta x/2}$) and the minimum peak voltage value ($V_{\Delta x/2}$) among the outputted voltage values, and the microcomputer 443 calculates vibration displacement generated according to vibration of the vibrator 40 in the forward/backward direction on the basis of the detected maximum and minimum peak voltage values ($V_{-\Delta x/2}$ and $V_{\Delta x/2}$) and the previously measured shortest distance value.

The microcomputer 443 outputs the calculated vibration displacement to the system controller 445, and then, the system controller 445 exactly determines whether vibration has been generated at the vibrator 40 on the basis of the received vibration displacement.

This can be expressed by equations.

First, when light is irradiated from the light emitting unit 42 and reflected on the mirror 41, the distance along which light has passed can be expressed by equation (1) shown below:

$$L = 2\sqrt{x^2 + (d/2)^2} \approx 2x \tag{1}$$

wherein 'd' is a distance between the light emitting unit and the light receiving unit, 'x' is the shortest distance between the light emitting unit and the mirror, and d/2 has a relatively smaller value than 'x'.

The relation between the distance along which light has passed and the amount of light generated from the light receiving unit 43, namely, an output voltage ($V_0$) can be expressed by equation (2) shown below:

$$V_0 = \frac{k}{L^2} = \frac{k}{(2x)^2} \tag{2}$$

wherein 'k' is a proportional constant and means a constant including the amount of light irradiated from the light emitting unit, efficiency of the light receiving unit and a current-to-voltage gain according to a resistor connected to the light receiving unit.

The maximum peak voltage ($V_{-\Delta x/2}$) and the minimum peak voltage ($V_{\Delta x}/2$) obtained by equation (2) can be expressed by equation (3) and equation (4) shown below:

$$V_{-\Delta x/2} = \frac{k}{(2x - \Delta x/2)^2} \quad (3)$$

$$V_{\Delta x/2} = \frac{k}{(2x + \Delta x/2)^2} \quad (4)$$

Thereafter, vibration displacement calculated through equation (3) and equation (4) can be expressed by equation (5) shown below:

$$\Delta x = \frac{r-1}{r+1} \times 2x, \text{ wherein } r = \sqrt{\frac{V_{-\Delta x/2}}{V_{\Delta x/2}}} \quad (5)$$

As a result, the vibration displacement calculating unit 44 can accurately calculate vibration displacement generated as the vibrator 40 is vibrated in a forward/backward direction on the basis of the distance between the light emitting unit 42 and the mirror 41, and the maximum peak voltage ($V_{-\Delta x/2}$) and the minimum peak voltage ($V_{\Delta x/2}$) obtained when the vibrator is not vibrated.

As so far described, the apparatus and method for calculating vibration displacement of a vibrator in accordance with the present invention has the following advantages.

That is, for example, light is irradiated to a vibrator, light reflected from the vibrator is received, and then, an output voltage corresponding to the amount of the received light is measured, whereby vibration displacement of the vibrator can be accurately measured.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for calculating vibration displacement of a vibrator, the apparatus comprising:
   a mirror attached to a predetermined portion of the vibrator;
   a light emitting unit installed at a predetermined position spaced apart from the mirror and irradiating light on the mirror;
   a light receiving unit installed side by side with the light emitting unit, receiving light reflected by the mirror and generating an output voltage corresponding to the amount of the receiving light; and
   a vibration displacement calculating unit for calculating vibration displacement of the vibrator based on the generated output voltage,
   wherein the vibration displacement calculating unit comprises:
   an output voltage measuring unit for measuring output voltage values generated from the light receiving unit;
   a peak voltage detecting unit for detecting a maximum peak voltage value and a minimum peak voltage value among the measured output voltage values; and
   a microcomputer for calculating vibration displacement of the vibrator on the basis of the detected maximum peak voltage value and minimum peak voltage value and a previously measured shortest distance.

2. The apparatus of claim 1, further comprising:
   a system controller for determining whether the vibration has been generated from the vibrator on the basis of the calculated vibration displacement.

3. The apparatus of claim 1, wherein the previously measured shortest distance is a value obtained by measuring a distance between the light emitting unit and the mirror when no vibration was generated from the vibrator.

4. The apparatus of claim 1, wherein the light emitting unit is a light emitting diode.

5. The apparatus of claim 4, wherein the light emitting unit irradiates light onto a central portion of the mirror.

6. The apparatus of claim 5, wherein the light emitting unit irradiates light during only a predetermined time.

7. The apparatus of claim 1, wherein the light receiving unit is either a photo diode or a photo transistor.

8. The apparatus of claim 7, wherein the light receiving unit receives light reflected from a central portion of the mirror.

9. The apparatus of claim 1, wherein the vibration displacement is generated as the vibrator is vibrated in a forward/backward direction.

10. The apparatus of claim 9, wherein the vibration displacement is calculated by $$\frac{r-1}{r+1} \times 2x, \text{ wherein } 'r' \text{ is } \sqrt{\frac{\text{minimum peak voltage value}}{\text{maximum peak voltage value}}},$$

and 'x' is a distance between the light emitting unit and the mirror obtained when no vibration is generated from the vibrator.

11. A method for calculating vibration displacement of a vibrator, the method comprising:
   measuring the shortest distance between a mirror attached to the vibrator and a light emitting unit;
   irradiating light to the mirror and receiving light reflected from the mirror;
   measuring an output voltage value according to the amount of received light;
   detecting a maximum peak voltage value and a minimum peak voltage value among the measured output voltage values; and
   calculating vibration displacement of the vibrator based on the detected maximum peak voltage value, the minimum peak voltage value and the measured shortest distance.

12. The method of claim 11, further comprising:
   determining whether vibration has occurred from the vibrator on the basis of the calculated vibration displacement.

13. The method of claim 11, wherein the measured shortest distance is a value obtained by measuring a distance between the light emitting unit and the mirror when no vibration was generated from the vibrator.

14. The method of claim 11, wherein the light emitting unit irradiates light onto a central portion of the mirror.

15. The method of claim 14, wherein the light emitting unit irradiates light during only a predetermined time.

16. The method of claim 11, wherein the vibration displacement is generated as the vibrator is vibrated in a forward/backward direction.

17. The method of claim 16, wherein the vibration displacement is calculated by $$\frac{r-1}{r+1} \times 2x, \text{ wherein } `r` \text{ is } \sqrt{\frac{\text{minimum peak voltage value}}{\text{maximum peak voltage value}}},$$

and 'x' is a distance between the light emitting unit and the mirror obtained when no vibration is generated from the vibrator.

18. An apparatus for calculating vibration displacement of a vibrator, the apparatus comprising:
- a mirror attached to a predetermined portion of the vibrator;
- a light emitting unit installed at a predetermined position spaced apart from the mirror and irradiating light on the mirror;
- a light receiving unit installed side by side with the light emitting unit, receiving light reflected by the mirror and generating an output voltage corresponding to the amount of the receiving light; and
- a vibration displacement calculating unit for calculating vibration displacement of the vibrator based on the generated output voltage, wherein the vibration displacement is generated as the vibrator is vibrated in a forward/backward direction, and wherein the vibration displacement is calculated by $$\frac{r-1}{r+1} \times 2x, \text{ wherein } `r` \text{ is } \sqrt{\frac{\text{minimum peak voltage value}}{\text{maximum peak voltage value}}},$$

and 'x' is a distance between the light emitting unit and the mirror obtained when no vibration is generated from the vibrator.

* * * * *